Aug. 18, 1931.  F. D. HILDRETH  1,819,169
LEAK STOP
Filed March 18, 1930  2 Sheets-Sheet 1
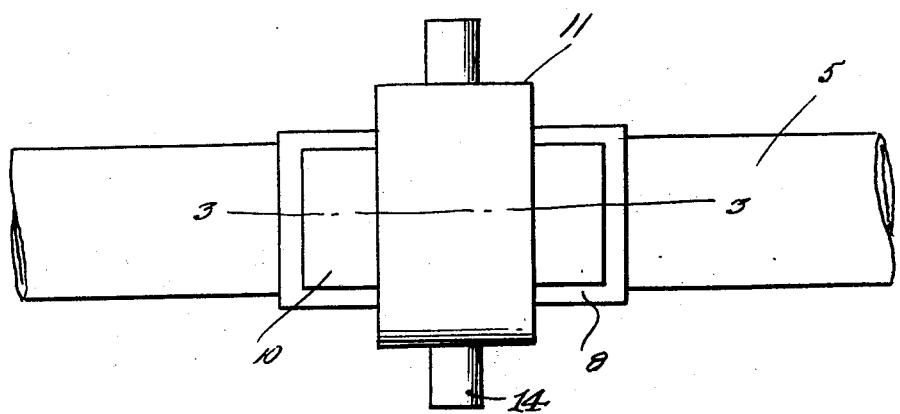
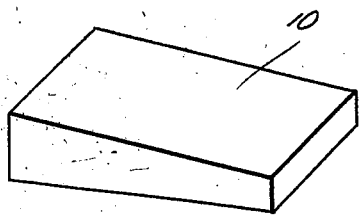
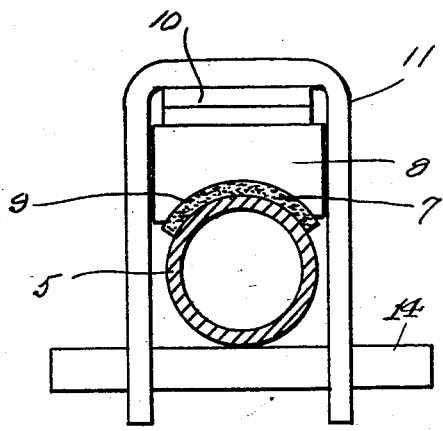
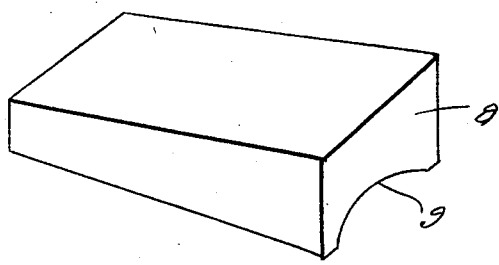
Inventor
F. D. Hildreth
By Clarence A. O'Brien
Attorney

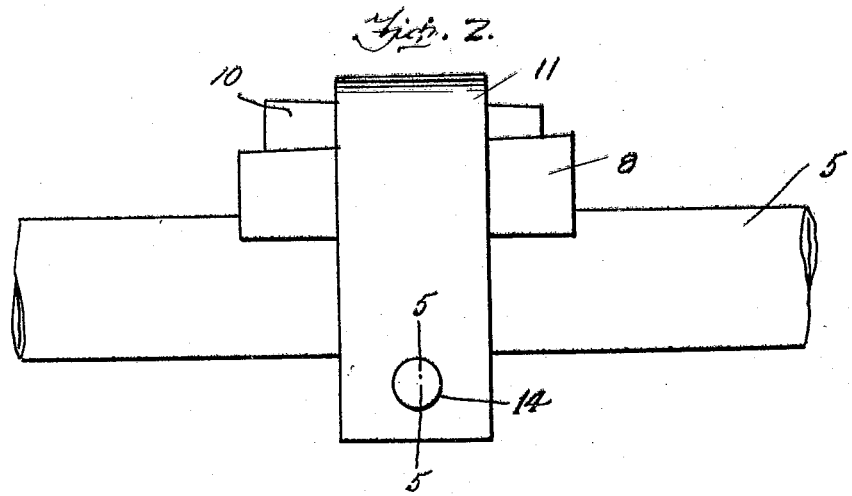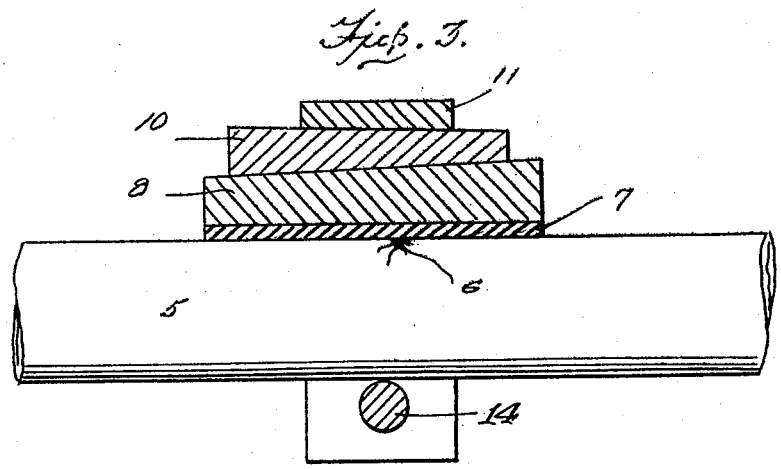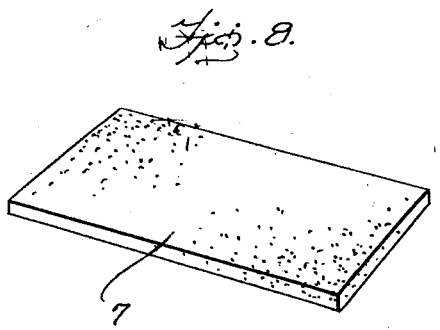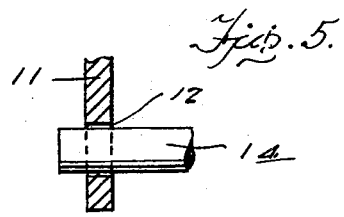

Patented Aug. 18, 1931

1,819,169

UNITED STATES PATENT OFFICE

FRED D. HILDRETH, OF MOUNT VERNON, OHIO

LEAK STOP

Application filed March 18, 1930. Serial No. 436,808.

The present invention relates to a leak stop and the object thereof is to provide means for stopping leaks and bursts in pipes for conducting water, steam, gas and other fluids.

Another important object of the invention resides in the provision of a device of this nature which is exceedingly simple in its construction, easy to assemble and disassemble, strong, inexpensive to manufacture, and thoroughly reliable and efficient in use.

With the above and numerous other objects in view as will appear as the description proceeds, the invention resides in certain novel features of construction, and in the combination and arrangement of parts as will be hereinafter more fully described and claimed.

In the drawings:

Figure 1 is a top plan view of the device embodying the features of my invention, Figure 2 is a side elevation thereof, Figure 3 is a longitudinal section therethrough taken substantially on the line 3—3 of Figure 1, Figure 4 is an end view thereof, Figure 5 is a detail section taken substantially on the line 5—5 of Figure 2, Figure 6 is a perspective view of the wedge, Figure 7 is a perspective view of the block, and Figure 8 is a perspective view of the gasket.

Referring to the drawings in detail it will be seen that the numeral 5 denotes a pipe having a leak or break 6 thereon. The numeral 7 denotes a pliable gasket plate which is placed over the leak 6 and the plate bent to conform to the curvature of the pipe. A block 8 is provided with a semi-cylindrical dished out space 9 which is placed against the gasket 7 and the opposed face is inclined toward the pipe to form an incline circuit over which is adapted to slide wedge 10.

A U-shaped member 11 has its bight portion disposed adjacent the wedge 10 and extends to straddle the wedge, the block 8, the gasket and the pipe. The ends are provided with openings 12 so that a pin portion 14 may be inserted therein at the opposite side of the pipe 5 from the block and wedge.

Therefore by driving the wedge inwardly the gasket plate may be tightened against the pipe so as to stop the leaking.

From the above detailed description, it will be seen that I have devised an exceedingly simple device which may be assembled very easily and quickly and of course may be just as easily disassembled.

It is thought that the construction, utility and advantages of this invention will now be quite apparent to those skilled in this art without a more detailed description thereof.

The present embodiment of the invention has been disclosed in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. A device of the class described including a U-shaped member having apertured end portions, a block having a dished out face and an opposed inclined face, a wedge to be disposed between the inclined face and the bight portion of the U-shaped member and a pin to extend through the apertured end portions.

2. A device of the class described including a U-shaped member having apertured end portions, a block having a dished out face and an opposed inclined face, a wedge to be disposed between the inclined face and the bight portion of the U-shaped member and a pin to extend through the apertured end portions, a pliable gasket plate adapted to be disposed against the pipe in which a leak is to be stopped and the dished out face of the block.

In testimony whereof I affix my signature.

FRED D. HILDRETH.